July 17, 1962     R. G. METZNER ETAL     3,045,065
INTERCOMMUNICATION SYSTEM
Filed Oct. 23, 1959

INVENTORS.
ROBERT G. METZNER
ARTHUR J. GROLITZER
BY
Lyon & Lyon
ATTORNEYS.

United States Patent Office 3,045,065
Patented July 17, 1962

---

3,045,065
INTERCOMMUNICATION SYSTEM
Robert G. Metzner, Hollywood, and Arthur J. Grolitzer, Los Angeles, Calif., assignors to Califone Corporation, Los Angeles, Calif., a corporation of California
Filed Oct. 23, 1959, Ser. No. 848,293
2 Claims. (Cl. 179—1)

This invention relates to intercommunication systems and, more particularly, to improvements and intercommunication systems employed for teaching groups of students.

There has been developed a system for teaching groups of students subject matters, such as languages, wherein the lessons are recorded on tape. The prerecorded tape is reproduced for the students, and, in language teaching for example, the students are given questions which they must answer in the language which they are studying. It is found to be advantageous to not only have a teacher hear what the student is saying but also to have the student himself hear what he is saying, so that he may hear any defects in pronunciation. It is an impossible task to have one teacher listen to a plurality of students answering the questions being given by the reproduced tape. Therefore, systems have been developed wherein a student will talk into a microphone and a teacher can selectively switch headphones or a loudspeaker to the microphone of the different students.

This arrangement, while proving satisfactory for enabling a teacher to monitor the answers of the students, does not benefit the students to too great an extent, unless the teacher can instantly correct any mistakes which the student is making. This, of course, calls for a means of communication between the teacher and the student, as well as between the student and the teacher. It is also important that any corrections or conversations between teacher and student while the tape is being reproduced not be overheard by other students, since this serves as a distraction.

Thus, an object of this invention is to provide a novel arrangement for intercommunication between teacher and student while distributing a sound from a recorded source.

Another object of the present invention is to provide a novel intercommunication system of the type described, wherein a teacher can selectively listen to the responses of students.

Yet another object of the present invention is to provide an arrangement of the type described, wherein a teacher can hold conversations with selected students without the other students being disturbed.

Still another object of the present invention is to provide a novel, simple, and economical arrangement for enabling the intercommunication between a teacher and students who are simultaneously receiving a distribution of recorded sound.

Still a further object of the present invention is to provide an electrical intercommunication system for enabling the distribution of recorded sound while enabling a teacher to speak to selected students, wherein the circuits interconnecting the various students and the teacher are at a comparatively low impedance so as to avoid crosstalk between the circuits and A.C. hum pickup from power lines in the vicinity of such circuits.

These and other objects of the invention are achieved in an arrangement wherein there is provided for the teacher, as well as for each student, a microphone and amplifier, and a reproducer. The microphone is connected to the input of the amplifier; the reproducer is connected to the output of the amplifier. The amplifier also has an input-output terminal, wherein signals applied thereto are reproduced by the reproducer and wherefrom an output can be derived which can be applied to the input-output terminal of other amplifiers. A switch is provided for each student, and this switch connects the input-output terminal of the teacher's amplifier to the input-output terminal of a different one of the student amplifiers.

A tape recorder is used to reproduce the tape containing the lesson. The output of the tape recorder is connected to the input-output terminal of each one of the amplifiers of the students through buffering means. This serves the function of providing a proper impedance match, as well as isolating the student amplifiers from one another. By selectively operating the switches, the teacher can hear the responses of each one of the students to the questions being propounded by the recorded tape. He can also hear the recorded tape and thus determine what questions are being answered. The teacher may also speak to any one or group of students, to point out wherein an error has been made. A student can hear himself answer the questions and can also reply to the teacher when the teacher has operated his switch.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
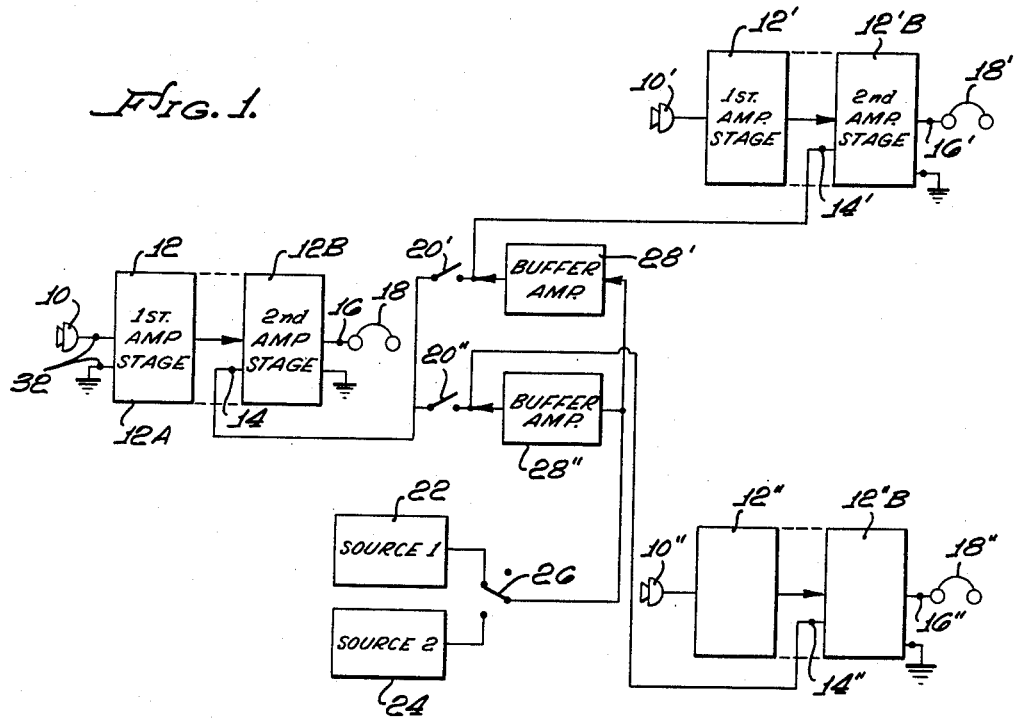
FIGURE 1 is a block diagram of an embodiment of the invention.

Referring now to FIGURE 1, there is shown a block diagram of an embodiment of the invention. This will include, for the teacher, the microphone 10, which is connected to the input of an amplifier 12. Amplifiers 12, 12' and 12" are sometimes referred to as "communications amplifiers." By way of illustration, and not to be considered as a restriction upon the invention, a suitable amplifier includes a first amplifier stage 12A and a second amplifier stage 12B. The first amplifier stage applies its output to the second amplifier stage. The second amplifier stage also includes a terminal 14, which will be designated as the input-output terminal. The reason for this nomenclature will become clear as this description progresses. However, at this point, it should be understood that any signals applied to the input-output terminal will be applied by the second amplifier stage 12B to an output terminal 16, to which there is connected a reproducer 18, such as a pair of headphones. Also, whatever signals have been amplified by the first amplifier stage may be derived from the input-output terminal 14 and applied elsewhere.

Each student in the class is also provided with the same equipment as has just been described for the teacher. Thus, by way of illustration, one set of this equipment for one student will have the referenced numeral 10' applied to the microphone, 12' applied to the two-stage amplifier, 14' applied to the input-output terminal, 16' applied to the output terminal, and 18' applied to the reproducer. For another student, by way of illustration, there will be provided a microphone 10" which is connected to the input of the two-stage amplifier 12". The output of the two-stage amplifier 16" has connected thereto the reproducer 18". An input-output terminal 14" is also provided. The equipment comprising microphone 10, communications amplifier 12, and reproducer 18 is sometimes referred to as a "teacher station." The equipment comprising buffer amplifier 28', microphone 10', communications amplifier 12', and reproducer 18' is sometimes referred to as a "student station," as is the equipment of corresponding numbers bearing double primes.

The input-output terminal 14 of the teacher's amplifier is connected to a plurality of switches 20', 20". There is provided one switch for each one of the students. The other side of each switch is connected to the input-output terminal of a different one of the students. Thus, switch 20' is connected between the input-output terminal 14 of the teacher's amplifier and the input-output terminal 14' of the student's amplifier. The switch 20" is connected between the input-output terminal 14 of the teacher's amplifier and the input-output terminal 14" of the student's amplifier.

From what has been described thus far, it will be understood that by a selective operation of the switches 20', 20", etc., the teacher may talk to any one of the students or may listen to what any one of the students is saying. Closing the switch 20' enables the teacher to talk to the student at the position to which the switch is connected. However, the student connected to the switch 20" or to any of the other switches which are maintained open will not hear the conversation between the student and the teacher, nor will he hear what the student is saying.

A source 22 and a second source 24, respectively, represent two separate sources of lessons. These can be either a tape or a record which is being reproduced. A switch 26 is used by the teacher for selecting one of the sources. The switch 26 is connected to the inputs of a plurality of buffer amplifiers 28', 28". A buffer amplifier is provided for each student amplifier. The output of each buffer amplifier is connected to the respective input-output terminal of the different ones of the student amplifiers. Thus, the source being reproduced is applied to each one of the input-output terminals of the students. All of the students can then hear the lesson being reproduced. The teacher can also hear this lesson by operating any one of the switches 20', 20". The buffer amplifiers all serve to prevent anything a student may be saying or anything the teacher may say to the student from being heard by other students, whose switches have not been closed by the teacher.

Figure 2:
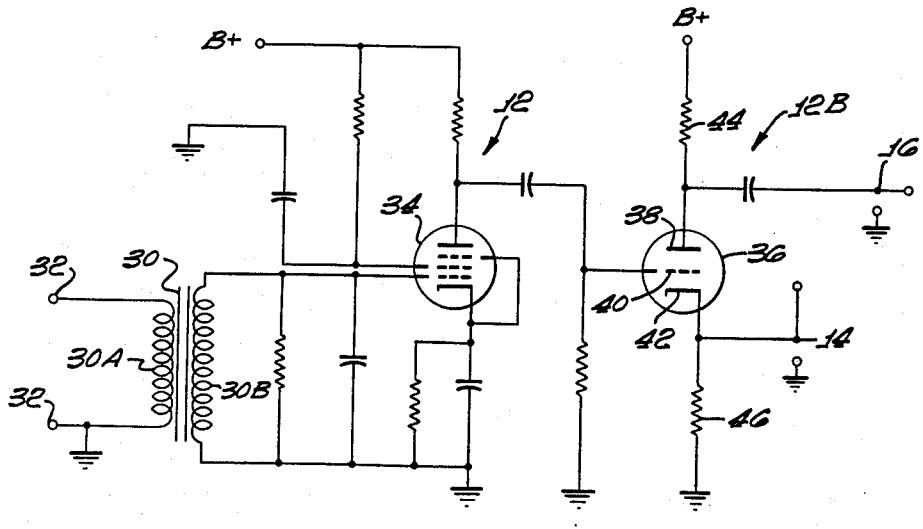
FIGURE 2 is a circuit diagram of an amplifier which is suitable for employment in the embodiment of the invention.

FIGURE 2 is a circuit diagram of an amplifier which is suitable for being used in the embodiment of the invention shown in FIGURE 1. This amplifier includes an input transformer 30 having a primary winding 30A with input terminal 32, to which the microphone is connected. The secondary winding 30B of the transformer 30 is connected to the control grid of a tube 34. The tube 34 is connected in well-known amplifier fashion to the source of B+. The output from the tube 34 is applied to the second stage of the amplifier. This second stage includes a tube 36, having an anode 38, a control grid 40, and a cathode 42. The anode 38 is connected to B+ through an anode load 44. The anode is connected to an output terminal 16, to which headphones or other form of reproducer may be connected. The cathode 42 has connected thereto a cathode load 46. The cathode of the tube is connected to a terminal 14, which has been heretofore designated as the input-output terminal.

Any signals which are applied to the input terminals 32 from a microphone are amplified by the tube 34 and are applied to the control grid of the tube 36. These signals are also reproduced on the cathode of the tube 36 and therefore may be applied to succeeding apparatus for the purpose of their reproduction. Also, any signals which are applied to the terminal 14 are applied to the cathode 42 of the tube 36 and will be applied by the tube 36 to the headphones which are connected to the output terminal 16. Thus, the significance of the term input-output terminal, applied to terminal 14 connected to the cathode of tube 36, should now be understood.

From the foregoing description it will be apparent that there has been described a novel and useful intercommunication system whereby a teacher can selectively communicate with any one of a plurality of students by the mere operation of a switch. He can hear what the student is saying in response to a lesson which is being reproduced at the location of each student. Each student can respond to the lesson he is hearing and will hear his own response. This response will not be heard by any of the other students and can be listened to by the teacher, if he so desires. The teacher and the student can communicate with one another without being heard by any of the other students. The system is inexpensive and eliminates the necessity for separate amplifiers for receiving signals from the teacher and from the student. The system also is a low-impedance one, since the impedance of the intercommunication circuits is determined by the impedance of the cathode load, which normally is low. Thus, crosstalk or hum pickup is substantially eliminated.

We claim:

1. Intercommunication apparatus for supplying a lesson to a plurality of students from a single source and enabling each student to respond individually, and have the individual responses monitored, and to receive individual instruction from a teacher, comprising: a recorded lesson source; a teacher station and a plurality of student stations, each said station comprising a microphone, a reproducer, and a communication amplifier having an input terminal, an output terminal, and an input-output terminal, the microphone and reproducer being respectively connected to the input and output terminals, each output terminal being so connected as to receive signals applied at its respective inlet terminal and inlet-outlet terminal, whereby the reproducer is activated by signals derived from its respective microphone and from its respective input-output terminal, the input-output terminals all being so connected as to receive signals applied at their respective input terminal, whereby signals derived from each microphone are applied to the respective input-output terminal, a buffer amplifier included in each student station, each buffer amplifier having an input terminal and an output terminal, the output terminal of each buffer amplifier being connected to the input-output terminal of its respective communication amplifier, and the input terminal of all buffer amplifiers being connected to the lesson source to receive signals therefrom; a student-station selector switch for each student station located in proximity to the teacher station, each said switch having a first terminal and a second terminal, the first terminal of each switch being connected to the input-output terminal of the teacher station communication amplifier, and the second terminal of each said switch being connected to a respective student station input-output terminal, whereby with said switches open, the student is enabled to hear the lesson source through his reproducer and respond to it by speaking into his microphone, hearing his response in his activated earphones, and whereby closing one or more of said switches enables the teacher to speak into his microphone and have two-way communication with the respective students whose switches are closed, each buffer amplifier serving to prevent a signal from any student station from being applied to any other student station with the signal from the lesson source.

2. Intercommunication apparatus according to claim 1 in which each communication amplifier has a first stage and a second stage, the first stage amplifying the signal applied to the input terminal by the microphone, and producing a voltage proportional to the said signal, said second stage comprising a tube including an anode, a cathode, and a grid, the said voltage being applied to the grid, a cathode load connected to the cathode, an anode load connected to the anode, means connecting the respective output terminal to the anode, the input-output terminal being connected to the cathode, whereby the second stage operates as a cathode follower.

References Cited in the file of this patent

UNITED STATES PATENTS 2,655,557   Stanbury _____ Oct. 13, 1953

OTHER REFERENCES

"Teaching by Tape," the Sunday Star—the Star Magazine Section, Washington, D.C., August 23, 1959 (pages 68–69 relied upon).

"Modern Foreign Languages," purchase guide for programs in science, math. and foreign languages (pp. 267–269, relied upon).